United States Patent
Bloch et al.

(10) Patent No.: US 9,462,047 B2
(45) Date of Patent: *Oct. 4, 2016

(54) NETWORK INTERFACE CONTROLLER SUPPORTING NETWORK VIRTUALIZATION

(71) Applicant: Mellanox Technologies Ltd., Yokneam (IL)

(72) Inventors: Noam Bloch, Bat Shlomo (IL); Eitan Hirshberg, Pardes Hana Karkur (IL); Michael Kagan, Zichron Yaakov (IL); Lior Narkis, Petach Tikva (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/637,414

(22) Filed: Mar. 4, 2015

(65) Prior Publication Data

US 2015/0180959 A1 Jun. 25, 2015

Related U.S. Application Data

(63) Continuation of application No. 13/731,130, filed on Dec. 31, 2012, now Pat. No. 9,008,097.

(51) Int. Cl.
*H04L 12/28* (2006.01)
*H04L 29/08* (2006.01)
*H04L 12/715* (2013.01)
*H04L 12/46* (2006.01)
*G06F 9/455* (2006.01)

(52) U.S. Cl.
CPC ........... *H04L 67/10* (2013.01); *G06F 9/45533* (2013.01); *H04L 12/4633* (2013.01); *H04L 45/64* (2013.01)

(58) Field of Classification Search
CPC ........................................................ H04L 67/10
USPC ........................................................... 370/392
See application file for complete search history.

(56) References Cited

U.S. PATENT DOCUMENTS

| 8,570,856 | B2 | 10/2013 | Southworth et al. | |
| 9,008,097 | B2 * | 4/2015 | Bloch | 370/392 |
| 2005/0144313 | A1 | 6/2005 | Arndt et al. | |
| 2007/0248085 | A1 * | 10/2007 | Volpano | H04L 12/4679 370/389 |

(Continued)

OTHER PUBLICATIONS

U.S. Appl. No. 13/731,030 Office Action dated Jun. 3, 2015.

*Primary Examiner* — Wei Zhao
(74) *Attorney, Agent, or Firm* — D. Kligler IP Services Ltd.

(57) ABSTRACT

A network interface device includes a host interface for connection to a host processor having a memory. A network interface is configured to transmit and receive data packets over a data network, which supports multiple tenant networks overlaid on the data network. Processing circuitry is configured to receive, via the host interface, a work item submitted by a virtual machine running on the host processor, and to identify, responsively to the work item, a tenant network over which the virtual machine is authorized to communicate, wherein the work item specifies a message to be sent to a tenant destination address. The processing circuitry generates, in response to the work item, a data packet containing an encapsulation header that is associated with the tenant network, and to transmit the data packet over the data network to at least one data network address corresponding to the specified tenant destination address.

22 Claims, 3 Drawing Sheets

(56) References Cited

U.S. PATENT DOCUMENTS

| | | |
|---|---|---|
| 2010/0061385 A1 | 3/2010 | Welin et al. |
| 2011/0007741 A1 | 1/2011 | Kreeger et al. |
| 2012/0287932 A1* | 11/2012 | Haddad ............... H04L 61/6072 370/392 |
| 2013/0124750 A1* | 5/2013 | Anumala ............ H04L 12/4625 709/232 |

* cited by examiner

NETWORK INTERFACE CONTROLLER SUPPORTING NETWORK VIRTUALIZATION

CROSS-REFERENCE TO RELATED APPLICATION

This application is a continuation of U.S. patent application Ser. No. 13/731,130, filed Dec. 31, 2012, which is incorporated herein by reference.

FIELD OF THE INVENTION

The present invention relates generally to computer networks, and particularly to network virtualization and tunneling.

BACKGROUND

Some network virtualization technologies involve creating virtual Layer-2 and/or Layer-3 topologies on top of an arbitrary physical (Layer-2 or Layer-3) network. Network Virtualization decouples virtual networks and addresses from physical network infrastructure, providing isolation and concurrency between multiple virtual networks on the same physical network infrastructure. Such virtualized networks can be used, for example, in data centers and cloud computing services. Virtualized networks of this sort are commonly referred to as "overlay networks" or "tenant networks."

Connectivity in the virtual network topology may be provided by encapsulating Layer-2 frames (such as Ethernet frames) in Layer-3 packets (such as Internet Protocol [IP] packets), and transmitting the packets over the physical network. A virtual Layer-2 network of this sort can span multiple physical Layer-3 subnets. In this manner, computers on the virtual Layer-2 network (including both physical and virtual machines) at widely-separated locations can communicate with one another over the Internet or other Layer-3 network by exchanging Layer-2 frames.

A number of protocols have been developed to support network virtualization. For example, Sridharan et al. describe the NVGRE virtualization protocol in an Internet Draft entitled "NVGRE: Network Virtualization using Generic Routing Encapsulation," draft-sridharan-virtualization-nvgre-01 (Jul. 9, 2012), of the Internet Engineering Task Force (IETF). In NVGRE, every virtual Layer-2 or Layer 3 network is associated with a 24-bit identifier, called a Virtual Subnet Identifier (VSID). The VSID is carried in an outer header, allowing unique identification of the tenant's virtual subnet to various devices in the network. GRE is a proposed IETF standard (described in IETF Requests for Comments [RFC] 2784 and 2890), which provides a way to encapsulate an arbitrary protocol over IP. NVGRE leverages the GRE header to carry VSID information in each packet.

Another network virtualization protocol is VXLAN (Virtual eXtensible Local Area Network), which is described by Mahalingam et al. in an Internet Draft entitled "VXLAN: A Framework for Overlaying Virtualized Layer 2 Networks over Layer 3 Networks," identified by the IETF as draft-mahalingam-dutt-dcops-vxlan-02 (Aug. 22, 2012). VXLAN is a Layer-2 overlay scheme over a Layer-3 network, which supports virtual machines (VMs) in a multitenant environment. Each overlay is termed a VXLAN segment. Only VMs within the same VXLAN segment can communicate with one another. Each VXLAN segment is "scoped" through a 24-bit segment ID, termed the VXLAN Network Identifier (VNI). The VNI scopes the inner MAC (Layer-2) frame originated by the individual VM.

Due to this encapsulation, VXLAN could also be termed a tunneling scheme, in which each Layer-2 frame is encapsulated according to a set of rules. The end-point of the tunnel (VTEP) may be located within the hypervisor on the server that houses the VM. Thus, the VNI and VXLAN-related tunnel and outer header encapsulation are known only to the VTEP and are not exposed to the VM. Sridharan et al. describe a similar end-point function in NVGRE and state that a common deployment is for the end-point to be part of a hypervisor.

Other tunneling protocols, such as "IP in IP" encapsulation, are also known in the art.

SUMMARY

Embodiments of the present invention that are described hereinbelow provide methods and apparatus offering enhanced support for network virtualization.

There is therefore provided, in accordance with an embodiment of the present invention, a network interface device, including a host interface for connection to a host processor having a memory. A network interface is configured to transmit and receive data packets over a data network, which supports multiple tenant networks overlaid on the data network. Processing circuitry is configured to receive, via the host interface, a work item submitted by a virtual machine running on the host processor, and to identify, responsively to the work item, a tenant network over which the virtual machine is authorized to communicate, wherein the work item specifies a message to be sent to a tenant destination address on the tenant network. The processing circuitry is configured to generate, in response to the work item, a data packet containing an encapsulation header that is associated with the tenant network, and to transmit the data packet over the data network to at least one data network address corresponding to the specified tenant destination address.

In some embodiments, the processing circuitry is configured to read encapsulation header information for insertion in the encapsulation header from an encapsulation table in the memory that is indicated by the work item. The encapsulation table may be written to the memory, for each of the multiple tenant networks, by a virtual machine monitor running on the host processor. Typically, the work item contains an index to an entry in the encapsulation table corresponding to the specified tenant destination address, and the virtual machine obtains the index, to be conveyed to the network interface device, from the virtual machine monitor but is unable to access the encapsulation header information in the encapsulation table. In a disclosed embodiment, the processing circuitry is configured to read the encapsulation header information from the encapsulation table using a memory key that allows access only to entries in the encapsulation table that are assigned to the virtual machine that submitted the work item.

Additionally or alternatively, the work item includes multiple gather entries containing pointers to locations in the memory from which the processing circuitry is to read data for insertion into the data packet, including a gather entry containing an index to an entry in the encapsulation table containing the encapsulation header information.

In a disclosed embodiment, the processing circuitry is configured to generate and transmit the data packet to the specified tenant destination address without direct involvement of a virtual machine monitor running on the host processor.

In one embodiment, the data network is a Layer-3 network, and wherein the tenant networks are Layer-2 virtualized networks that are overlaid on the Layer-3 network.

In some embodiments, the processing circuitry is configured to decapsulate encapsulated data packets received from the data network and to convey the decapsulated data packets to the virtual machine. The processing circuitry may also be configured to filter and convey at least a part of the received data packets to a learner entity running on the host processor.

There is also provided, in accordance with an embodiment of the present invention, a computer system, including a memory and a host processor configured to access the memory and to run one or more virtual machines. A network interface controller (NIC) is configured to transmit and receive data packets over a data network, which supports multiple tenant networks overlaid on the data network, and is configured to read from the memory a work item submitted by a virtual machine running on the host processor, and to identify, responsively to the work item a tenant network over which the virtual machine is authorized to communicate, wherein the work item specifies a message to be sent to a tenant destination address on the tenant network. The NIC is configured to generate, in response to the work item, a data packet containing an encapsulation header that is associated with the tenant network, and to transmit the data packet over the data network to at least one data network address corresponding to the specified tenant destination address.

In a disclosed embodiment, a virtual machine monitor running on the host processor is configured to deliver a tenant address table to the virtual machine, indicating a correspondence between tenant destination addresses on the tenant network and indices to the encapsulation table from which the NIC is to read the encapsulation header information.

There is additionally provided, in accordance with an embodiment of the present invention, a method for communication, which includes configuring a network interface controller (NIC), which is coupled to a host processor having a memory, to transmit and receive data packets over a data network, which supports multiple tenant networks overlaid on the data network. The NIC receives a work item submitted by a virtual machine running on the host processor, and identifies, responsively to the work item, a tenant network over which the virtual machine is authorized to communicate, wherein the work item specifies a message to be sent to a tenant destination address on the tenant network. The NIC generates, in response to the work item, a data packet containing an encapsulation header that is associated with the tenant network. The data packet is transmitted over the data network to at least one data network address corresponding to the specified tenant destination address.

There is further provided, in accordance with an embodiment of the present invention, a computer software product, for use on a computer that includes a memory and a network interface controller (NIC), which is coupled to transmit and receive data packets over a data network, which supports multiple tenant networks overlaid on the data network. The product includes a computer-readable medium in which program instructions are stored, which instructions, when read by the computer, causes a virtual machine on the computer to submit to the NIC a work item, causing the NIC to identify, responsively to the work item, a tenant network over which the virtual machine is authorized to communicate, wherein the work item specifies a message to be sent to a tenant destination address on the tenant network and causes the NIC to generate a data packet containing an encapsulation header that is associated with the tenant network and to transmit the data packet over the data network to at least one data network address corresponding to the specified tenant destination address.

The present invention will be more fully understood from the following detailed description of the embodiments thereof, taken together with the drawings in which:

DETAILED DESCRIPTION OF EMBODIMENTS

Figure 1:
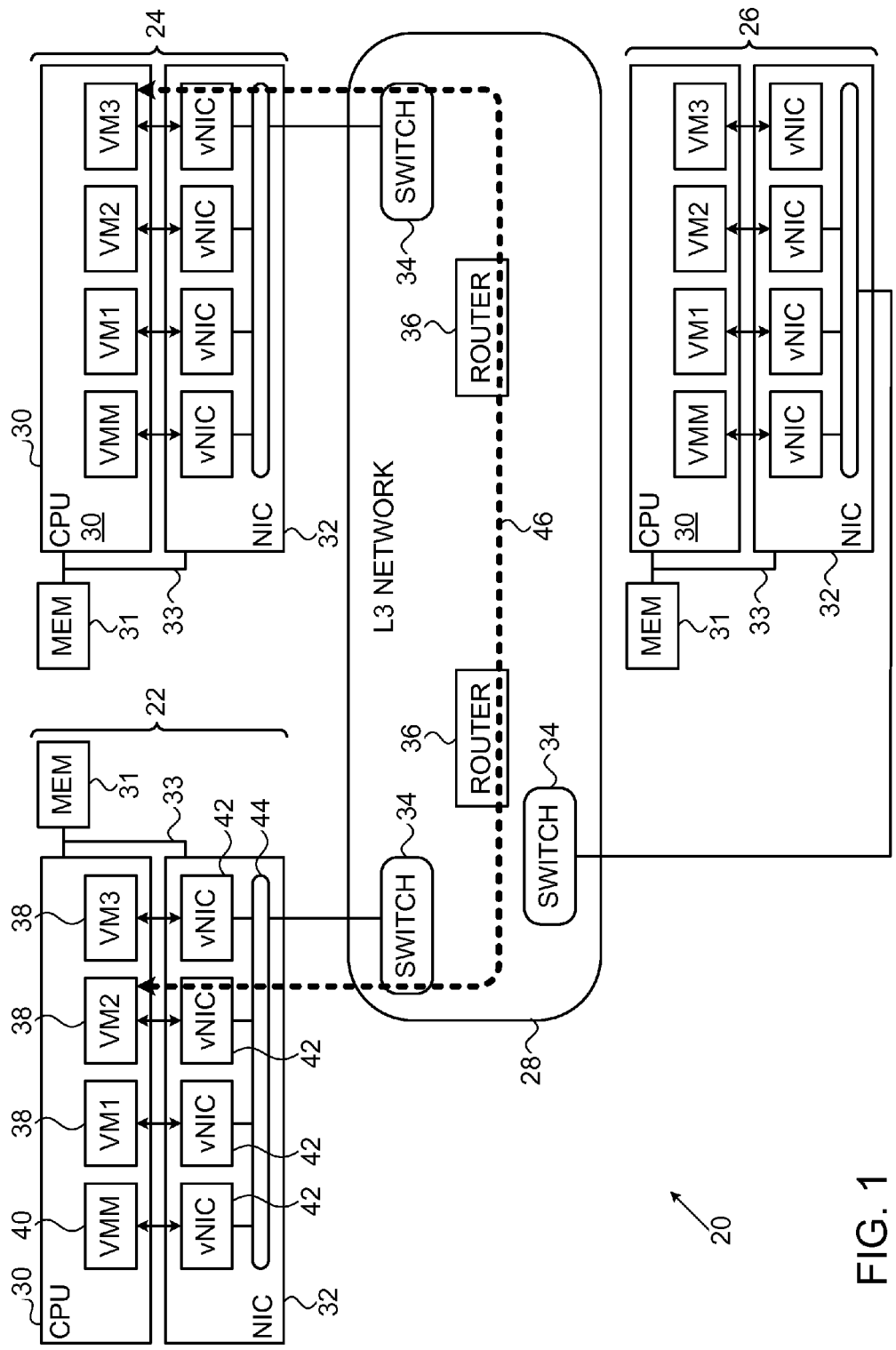
FIG. 1 is a block diagram that schematically illustrates a networked computer system, in accordance with an embodiment of the present invention.

Network virtualization schemes that are known in the art, such as NVGRE and VXLAN, do not allow virtual machines to access tunneling information, such as the VSID or VNI and the tunnel network address that is used in encapsulating packets that the virtual machines transmit and receive. Rather as explained above in the Background section, virtual machines in such schemes can transmit and receive data packets on their respective tenant (overlay) networks only via their local hypervisors. In other words, all such packets that are transmitted and received by a virtual machine must pass through the hypervisor for encapsulation and decapsulation.

There is a good reason for requiring the hypervisor to be involved in this way: In multi-tenant environments, the virtual machines are user-level programs, controlled by tenant network users, and cannot generally be considered trusted entities. To maintain proper isolation between tenant networks, it is necessary that tunneling functions be controlled by a trusted entity, such as the hypervisor. The need for the hypervisor to be involved in transmission and reception of all packets, however, can consume considerable computing power, and will tend to increase communication latency and reduce performance.

Embodiments of the present invention that are described hereinbelow address this problem by offloading certain network virtualization support functions to a network interface controller (NIC), so that the burden of virtualization support is shared between the central processing unit (CPU) and the NIC. The NIC, which is generally a trusted entity, is able to access encapsulation information that is written to tables in the host memory by the hypervisor (or by another entity that manages the tenant networks). Virtual machines may thus send and receive data packets directly over their tenant networks simply by submitting suitable work items to the NIC, without direct intervention of the hypervisor.

In the disclosed embodiments, a network interface device comprises a host interface for connection to a host processor and host memory, as well as a network interface, to transmit and receive data packets over a data network. The data network supports multiple tenant networks overlaid on the data network, wherein each tenant network comprises "tunnels" through the data network that connect the nodes of the tenant network. The host processor typically supports one or more virtual machines, which run over a virtual machine monitor, such as a hypervisor, on the host processor. Each virtual machine may be authorized to communicate over one or more of tenant networks with the nodes on the particular tenant network—and typically only with these nodes.

Processing circuitry in the network interface device receives, via the host interface, work items submitted by the virtual machines running on the host processor. The work items specify messages to be sent over tenant networks by pointing to data in the host memory for encapsulation in a data packet, including a destination address on the tenant network (which may be a unicast or multicast address) to which the data packet is to be sent. The work item may specify this tenant network address directly, or it may simply point to header data containing the address. In response to each such work item, the processing circuitry access context information to identify the tenant network over which this particular virtual machine is authorized to communicate, and generates a data packet containing the appropriate data, with an encapsulation header that is associated with the tenant network and contains the actual address on the data network at which the specified tenant destination address or addresses are located.

The work items submitted by the virtual machines direct the processing circuitry in the network interface device to read encapsulation header information, for insertion in the encapsulation header of the data packet, from a table in the host memory that is indicated by each such work item. There is a separate table of this sort for each tenant network, and each VM is able to direct the NIC to read the encapsulation header only from its own table, and not from a table of another tenant network. This table is typically written to the memory, for each of the multiple tenant networks, by a virtual machine monitor (VMM, also known as a "hypervisor") running on the host processor and residing in the hypervisor address space. The VMM writes the table to its own, privileged address space in the memory. It then provides the virtual machines, possibly by means of a suitable application program interface (API), with access to indices to the table that correspond to the nodes on the respective tenant networks, for insertion in the work items. The virtual machines themselves, however, are unable to access this table in VMM memory space, and isolation between the tenant networks is thus maintained.

Many network interface devices that are known in the art accept work items that contain a "gather list," i.e., a sequence of pointers to locations in the host memory. The network interface device then gathers (reads) data from the pointer locations by direct memory access (DMA) for insertion in data packets that it is to transmit. In some embodiments of the present invention, this model is extended to support tenant networks that use the sort of table that is described above, by placing an appropriate index to the tenant network table described above in at least one of the gather entries (such as the first gather entry) of each work item. This index typically corresponds to the entry in the table that contains the encapsulation data for this packet. Although tenant network encapsulation functions may alternatively be offloaded to the network interface device in other ways, the use of a gather entry to convey the table index is advantageous in that it takes advantage of the existing work item format and DMA mechanism in the network interface device, and thus facilitates support of network virtualization with only minimal modifications to existing hardware and software.

FIG. 1 is a block diagram that schematically illustrates a networked computer system 20, in accordance with an embodiment of the present invention. System 20 comprises multiple host computers 22, 24, 26, . . . (also referred to simply as "hosts"), which communicate over a packet data network 28. This data network may also be referred to as a physical network or underlying network, as it supports, in the present embodiment, multiple virtualized tenant networks, which are overlaid on network 28. Such tenant networks may operate, for example, in accordance with the above-mentioned NVGRE or VXLAN protocol, or in accordance with any other suitable protocol for encapsulation and tunneling of tenant network traffic.

Typically, although not necessarily, data network 28 is a Layer-3 network, such as an IP network, while the tenant networks are Layer-2 networks, such as Ethernet networks. Network 28 thus comprises Layer-3 routers 36, as well as switches 34, through which hosts 22, 24, 26, . . . , may connect to the network. The principles of the present invention, however, are similarly applicable over other sorts of data networks, such as InfiniBand networks; and the methods and circuits described herein can be used to support substantially any type of overlay network, including both Layer-2 and Layer-3 tenant networks, over an underlying Layer-2 and/or Layer-3 data network.

Each host 22, 24, 26 in this example comprises a central processing unit (CPU) 30, which typically comprises one or more processing cores (not shown), with a system memory 31 and a network interface controller (NIC) 32. NIC 32 is connected by a bus 33, which serves as its host interface, to CPU 30 and memory 31, and by a network interface 44 to network 28. Bus 33 may comprise, for example, a peripheral component bus, such as PCI Express™ bus, or a dedicated system bus of the CPU.

Hosts 22, 24, 26 support a virtual machine environment, in which multiple virtual machines 38 (labeled VM1, VM2, VM3 in FIG. 1) may run on any given CPU 30. A virtual machine monitor (VMM) 40 in the CPU native domain interacts with the kernels of the guest operating systems of virtual machines 38 in a manner that emulates the host processor and allows the virtual machines to share the resources of the CPU.

NIC 32 comprises packet processing circuitry, which is configured to appear to the programs running on CPU 30 as multiple virtual NICs (vNICs) 42. In a model that is known as single-root I/O virtualization (SR-IOV), each virtual machine 38 interacts with NIC 32 as though the NIC was dedicated to that virtual machine, linking the virtual machine to other machines (virtual and/or physical) on the same tenant network, possibly even including other virtual machines running on the same host. In this regard, network interface 44 acts as a virtual switch, connecting each of the virtual machines to its tenant network while allowing vNICs 42 to share the same physical port to underlying data network 28.

This virtualization of NIC functions is achieved by allowing each virtual machine 38 to interact with its own set of transport service instances (referred to herein as queue pairs, or QPs) in the NIC, and is supported in particular by offloading of encapsulation and tunneling functions from VMM 40 to NIC 32, as explained below in greater detail. In the example shown in FIG. 1, VM2 in host 22 and VM3 in host 24 reside on the same tenant network. In network virtualization systems that are known in the art, such as those described above in the Background section, to send a tunneled packet to VM3, VM2 submits the packet to VMM 40 in host 22; and the VMM encapsulates the packet and transmits it to the VMM in host 24, which then decapsulates and passes the packet to VM3. By contrast, in the present embodiment, VM2 in host communicates with VM3 in host 24 via a tunnel 46 simply by submitting a work item to the appropriate QP of vNIC 42.

NIC 32 in host 22 reads the necessary encapsulation information from memory 31 and then encapsulates and transmits the packet via tunnel 46 to the NIC in host 24, which decapsulates and delivers the packet (via memory 31 in host 24) to VM3. There is no need for any direct, active involvement by VMMs 40 in this process. The receiving NIC can decapsulate the packets simply by dropping the encapsulation header from the received packets. For example, the NIC may be configured to drop a predefined number of bytes from each arriving packet. Alternatively, the NIC can be configured to parse the packet, identify the encapsulation header and drop it. The NIC may be designed so that if a given QP is enabled to receive encapsulated packets, the NIC must be configured to drop the encapsulation header.

In addition, NIC 32 may be configured to send a copy of the packet or part of the packet (such as the header or a predefined number of bytes from the beginning of the packet) to a "learner" entity (in addition to the copy sent to its target VM). This learner is typically implemented in software running on host 22 (generally, although not necessarily, as a part of the management functions of VMM 40). The learner processes the packet information for learning and monitoring purposes. NIC 32 may filter the packets (or the parts of the packets) that it sends to the learner using a table, for example, whose entries contain packet header information. If the header of an arriving packet matches header information in the table, the NIC will not send a copy of the packet to the learner. Entries of this table can be updated by the learner. Alternatively or additionally, the NIC itself may update the entries based on the header fields of the packets that it sends to the learner, and it may also delete entries from the table when they have not been accessed for a predefined time period. (This latter mechanism is known as "aging.") Further additionally or alternatively, the NIC may be configured to send copies only of unicast and/or multicast and/or broadcast packets to the learner.

Typically, the packet processing circuitry in NICs 32 comprises dedicated hardware logic circuits, which are designed and programmed to carry out the functions described herein. Details of a hardware-based implementation of a host channel adapter (HCA) that can be modified to perform these functions are provided, for example, in U.S. Pat. No. 8,051,212, whose disclosure is incorporated herein by reference. Alternatively or additionally, at least some of the network virtualization features of NICs 32 can be carried out in software by a suitable embedded programmable processor.

Figure 2:
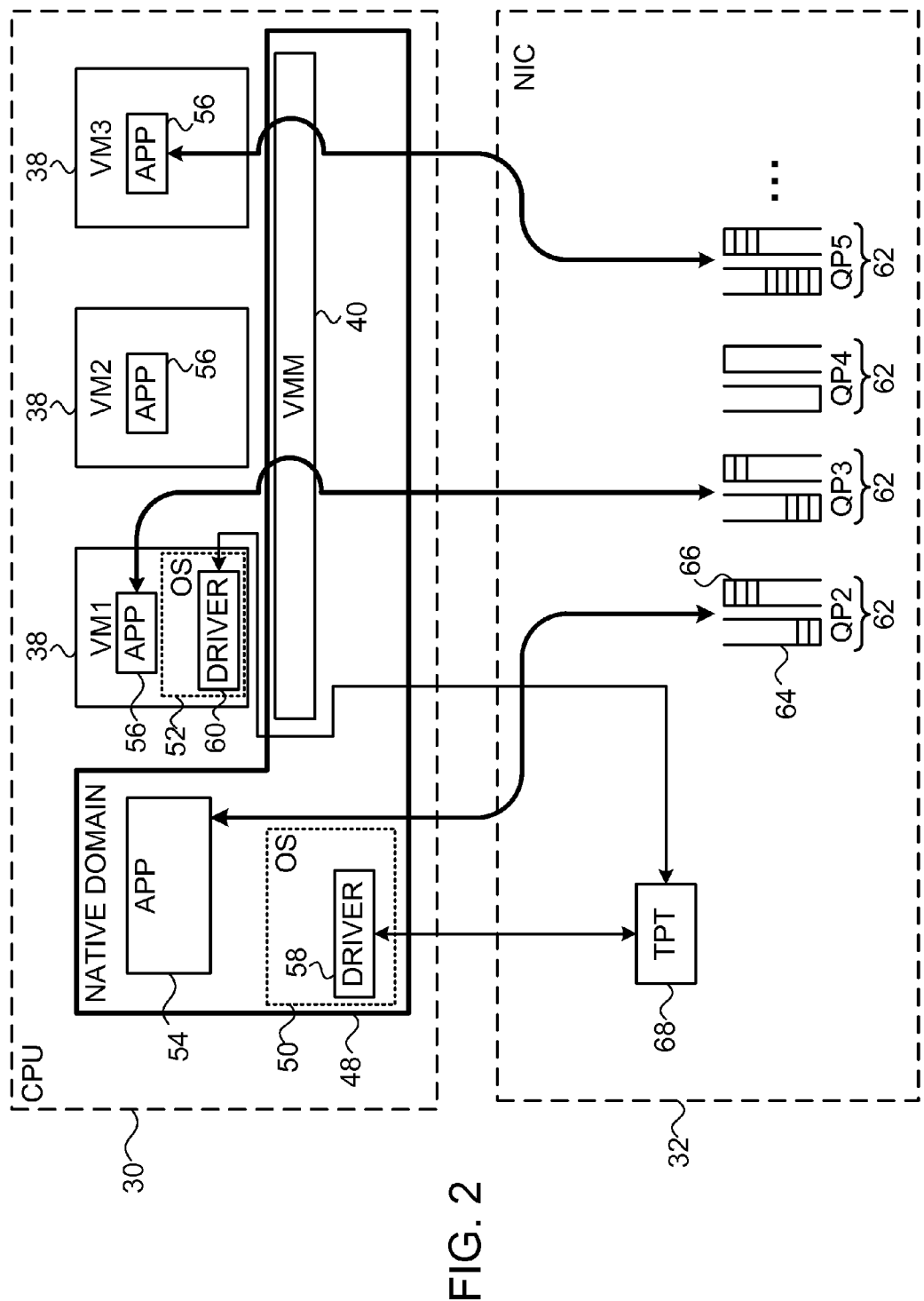
FIG. 2 is a block diagram that schematically illustrates hardware and software elements of a host computer, in accordance with an embodiment of the present invention.

FIG. 2 is a block diagram that schematically shows functional details of interaction between NIC 32 and software running on CPU 30, in accordance with an embodiment of the present invention. The software running on CPU 30, including both operating system and application programs, may be downloaded to the CPU in electronic form, over a network for example. Additionally or alternatively, the software may be stored on tangible, non-transitory computer-readable media, such as optical, magnetic or electronic memory media, which may be embodied in memory 31.

CPU 30 operates a native domain 48, with a host operating system 50, which may support host user applications 54 and other native processes. In addition, the CPU may concurrently run one or more virtual machines 38, as noted above, each with its own guest operating system 52 and guest user applications 56. (Only one guest OS is shown in FIG. 2 for the sake of simplicity; furthermore, in some implementations, applications may run exclusively in the guest domains or exclusively in the native domain.) VMM 40 in native domain 48 interacts with the kernels of guest operating systems 52 in a manner that emulates the host processor and allows the virtual machines to share the resources of the CPU. A wide range of virtual machine software of this sort is available commercially, and further description is beyond the scope of the present disclosure.

Client processes, such as applications 54 and 56, communicate with the transport layer of network 28 by manipulating a transport service instance, known as a "queue pair" (QP) 62, which is made up of a send work queue 64 and a receive work queue 66. To send and receive messages over the network using NIC 32, a client submits work items, called work queue elements (WQEs), to queues 64 and 66 of the appropriate QP 62 for execution by the NIC. More precisely, the client initiates work requests (WRs), which cause driver software (referred to simply as drivers 58 and 60) in the host and guest operating systems to place WQEs in the appropriate work queues in memory 31. NIC 32 reads and executes the WQEs from queues 64 and 66 and accordingly gathers data from specified locations in memory 31 and transmits the data in outgoing packets over network 28, as well as writing data from incoming packets to the memory.

As noted earlier, for efficient use of the resources of CPU 30 and NIC 32, both native domain 48 and virtual machines 38 are able to interact directly with the NIC, rather than passing commands and data through the native domain. Thus, as shown in FIG. 2, each application 54, 56 may be assigned one or more queue pairs 62 (labeled QP2, QP3, . . . , in the figure), as explained above. Furthermore, each virtual machine 38 may post control and configuration commands to the NIC via a respective command queue (not shown). In other words, the NIC appears to each virtual machine to be a dedicated I/O device, or vNIC, for use by that virtual machine in communicating directly over its assigned virtualized tenant network. This configuration minimizes the burden of communication on VMM 40 and on host operating system 50.

Using the respective QPs 62, each virtual machine 38 is also able to execute data flow operations directly between NIC 32 and memory 31. For this purpose, NIC driver 60 in each virtual machine 38 provides memory protection keys and virtual address spaces for use by the respective QPs. The driver loads the keys and address translation tables into a memory protection and translation (TPT) unit 68 of NIC 32, for use by the NIC in servicing work items in the QP. NIC driver 58 in native domain 48 loads keys and address translation tables for use by host applications 54. VMM 40 also loads keys and encapsulation header information into memory 31 for use by NIC 32 in generating packets for tunneled transmission over tenant networks used by virtual machines 38, as described below.

Figure 3:
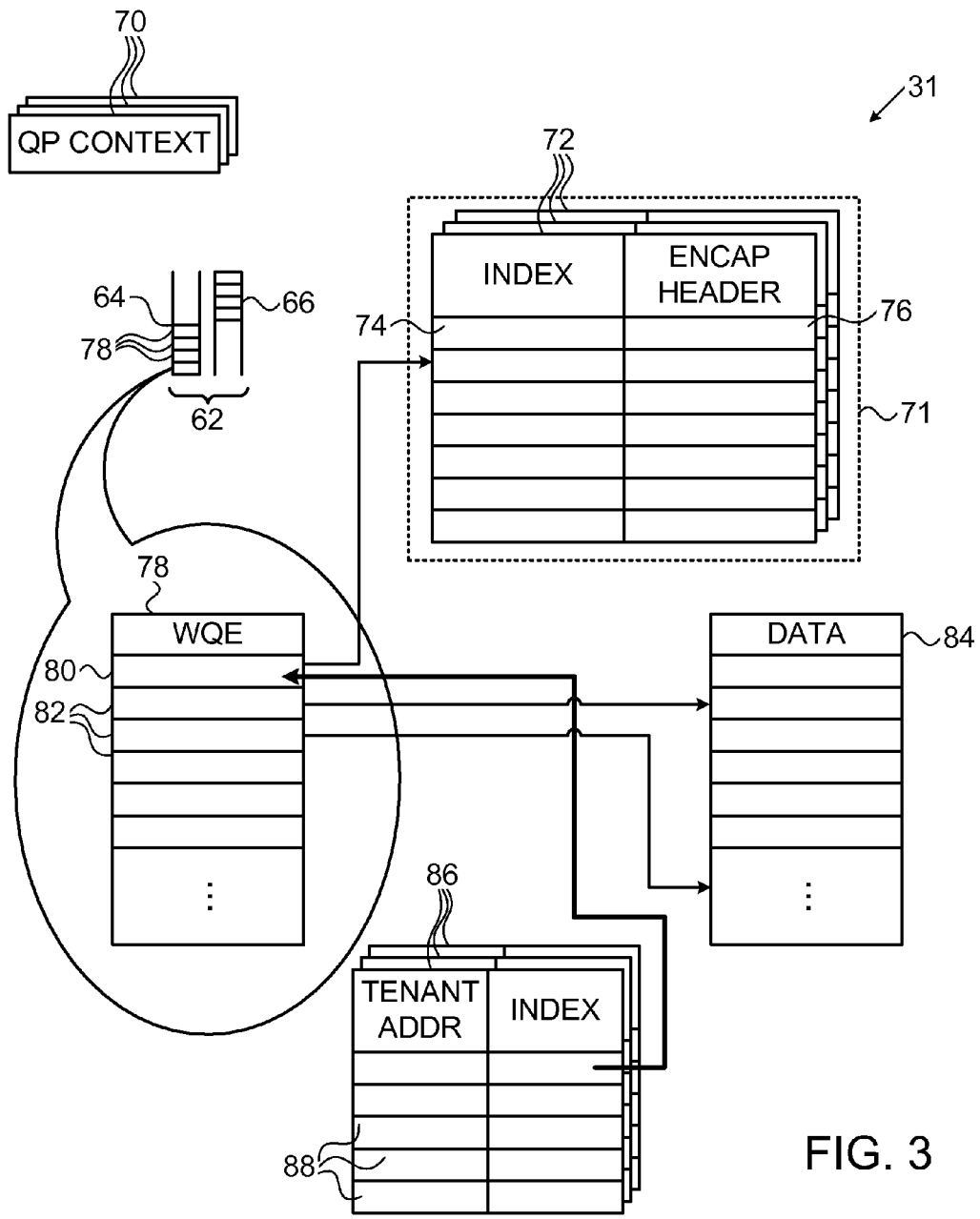
FIG. 3 is a block diagram showing data structures in a memory of a host computer, in accordance with an embodiment of the present invention.
Figure 4:
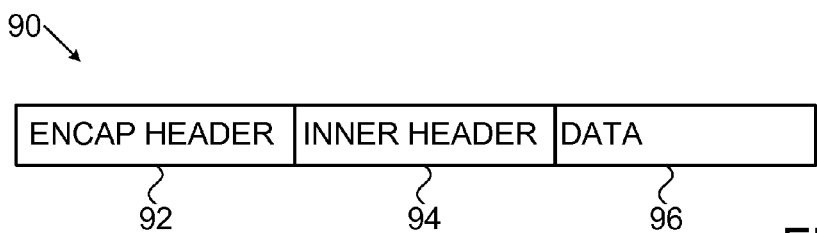
FIG. 4 is a block diagram showing a data packet, in accordance with an embodiment of the present invention.

Reference is now made to FIGS. 3 and 4, which schematically illustrate a method for network virtualization support, in accordance with an embodiment of the present invention. FIG. 3 is a block diagram showing data structures in memory 31 of a host computer (such as computer 22 in FIG. 1), while FIG. 4 is a block diagram showing a data packet 90 constructed by NIC 32 using these data structures. Although the method is described here with specific reference to the components of system 20 and computer 22 and to the particular data structures shown in FIG. 3, the principles of this method may likewise be applied, mutatis mutandis, in other network virtualization environments having the necessary characteristics and capabilities, as will be apparent to those skilled in the art after reading the present description.

Each QP 62 has a QP context 70 in memory 31 containing information that is used (and updated as appropriate) by NIC 32 and by software running on CPU 30 for communication on this QP. For purposes of network virtualization, context 70 may indicate that tunneling is enabled for the corresponding QP, meaning that NIC 2 should encapsulate and decapsulate packets that are transmitted and received on this QP.

For each tenant network that is supported by VMM 40 in system 20, the VMM writes an encapsulation table 72 to memory 31, containing data to be incorporated in encapsulation headers 92 of packets 90 that are to be transmitted over network 28 on this tenant network. Table 72 is typically maintained in a segment 71 of memory 31 that is assigned to VMM 40, and to which only the VMM is entitled to access. Segment 71 belongs to the VMM address space, which is separate from the VM address space in which the tenant address information and application data are stored.

Encapsulation header 92 may comprise, for example, medium access control (MAC) and IP headers, followed by the appropriate GRE header when the tenant network operates in accordance with NVGRE, or the UDP (User Datagram Protocol) and VXLAN headers when the tenant network operates in accordance with VXLAN, as explained in the Internet drafts cited above in the Background section. Each entry in table 72 has an index 74 corresponding to a particular destination on the tenant network and pointing to encapsulation header information for the tenant destination address in question. Although index 74 is shown in FIG. 3, for the sake of conceptual clarity, as a concrete entity, in practice the index may simply comprise the appropriate, unique memory key (MKey) for the virtual address range that is to e read, along with the memory address and length of the table entry.

Virtual machines 38 are not permitted to access encapsulation header information 76, and applications 56 running on the virtual machines are aware only of the virtualized tenant addresses of their peers (for example, virtual MAC and VLAN addresses) on the tenant network to which they belong. To permit virtual machines 38 to submit WQEs to NIC 32 with respect these tenant networks, VMM 40 provides drivers 60 on virtual machines 38 with a tenant address mapping table 86 in memory 31. Each entry 88 in table 86 is keyed to a tenant address (such as a particular destination MAC and VLAN) on the given tenant network and contains the corresponding index 74 to encapsulation table 72.

When application 56 on a given virtual machine 38 submits a work request to transmit one or more packets via NIC 32 to a given destination address (an address on the overlay network), driver 60 on the given virtual machine constructs a corresponding WQE 78 and places it in the appropriate send queue 64. The WQE comprises a gather list, as is known in the art, indicating segments of memory 31 whose contents are to be read by the NIC for insertion into the data packets. Each gather entry in the list typically contains a memory address (which may be a virtual address) and data length, along with the required MKey for the segment in question. TPT 68 in NIC reads and verifies the gather entries and, if necessary, translates the virtual addresses into physical address. NIC 32 then reads the data from the appropriate addresses in memory 31 by direct memory access (DMA.

When the work request submitted by application 56 refers to a destination tenant address on a tenant network supported by NIC 32, driver 60 looks up the entry 88 corresponding to the tenant address in tenant address table 86. The driver reads the corresponding index 74 to encapsulation table 72 from entry 88, and inserts this index as a first gather entry 80 in WQE 78. The remaining gather entries 82 in the WQE typically point to application data 84 in memory 31, which include an inner header 94 and data payload 96 of the encapsulated packet.

When WQE 78 reaches the head of queue 64 for execution, NIC 32 checks the corresponding QP context 70 and ascertains, inter alia, whether tunneling is enabled for this QP. If so, TPT 68 will interpret the first gather entry 80 as being directed to the segment in memory 31 that is assigned to VMM 40 and will use index 74 to access encapsulation header information 76 at the appropriate location (address and length) in table 72, in the VMM address space. To ensure that VM 38 does not exceed its privileges in accessing the VMM address space, NIC 32 permits access to table 72 only when allowed for the QP by context 70, only for first gather entry 80, and only with the exact predefined data length corresponding to the size of an encapsulation header 92 of a data packet 90. Furthermore, each QP may be limited to accessing its own table 72 by assigning the same protection domain (PD, as defined in the InfiniBand standard) to the QP and to the memory key that is used in accessing the table 72 that serves the QP. As a result, the only part of the VMM address space that any QP 62 can access is the specific encapsulation table 72 for that QP.

NIC 32 uses the information read from table 72 to create encapsulation header 92 of data packet 90 for transmission over network 28. The encapsulation header indicates the actual, physical address (such as Ethernet MAC and IP destination addresses) to which the packet is to be conveyed on network 28 and also contains encapsulation information as required by the appropriate network virtualization protocol (such as the VSID for NVGRE, or VNI for VXLAN).

The remaining gather entries 82, as noted above, point to data 84 in memory 31, to be written by NIC 32 to inner header 94 belonging to the tenant network and data payload 96 of packet 90. NIC 32 reads the appropriate data, completes the construction of packet 90, and transmits the packet over network 28. Upon receiving such a packet on a QP on which tenant network support is enabled, the receiving NIC will read encapsulation header 92 and inner header 94 in order to identify the vNIC 42 to which the packet should be steered and the VM 38 to which the encapsulated packet should be delivered. The NIC will then write inner header 94 and data 96 to an appropriate location in memory to be accessed by the receiving application.

Thus, NIC 32 is able to construct, transmit and receive packets over tenant networks at the request of virtual machines 38 without direct involvement of VMM 40. Although the VMM is responsible for preparing and writing tables 72 and 86 to memory 31, once the VMM has done so and has provided tables 72 to the virtual machines, the NIC takes over the duties of packet transmission and reception on the tenant networks, using a model substantially similar to protocol offload performed by the NIC on existing physical networks.

In an alternative embodiment, rather than requiring driver 60 to perform the table lookup and write gather entry 80 as described above, NIC 32 may access the necessary encapsulation information and construct the encapsulation header (and outer header) autonomously. In this embodiment, application 56 on VM 38 simply delivers the inner header and payload to NIC 32. The NIC looks up the encapsulation information in tables that it is able to access and then encapsulates and transmits the packet.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface device, comprising:
    a host interface for connection by a bus to a host processor having a memory;
    a network interface, which is configured to transmit and receive data packets over a data network, which supports multiple tenant networks overlaid on the data network; and
    processing circuitry, which is configured to read from the memory, via the host interface, a work item submitted by a virtual machine running on the host processor, and to identify, responsively to the work item read from the memory, a tenant network over which the virtual machine is authorized to communicate, wherein the work item specifies a message to be sent to a tenant destination address on the tenant network,
    wherein the processing circuitry is configured to generate, in response to the work item read through the host interface over the bus from the memory, a data packet containing an encapsulation header that is associated with the tenant network, and to transmit the data packet over the data network to at least one data network address corresponding to the specified tenant destination address,
    wherein the processing circuitry is configured to receive an inner header and payload of the data packet from the virtual machine and to construct the encapsulation header autonomously.

2. The device according to claim 1, wherein the processing circuitry is configured to generate and transmit the data packet to the specified tenant destination address without direct involvement of a virtual machine monitor running on the host processor.

3. The device according to claim 1, wherein the data network is a Layer-3 network, and wherein the tenant networks are Layer-2 virtualized networks that are overlaid on the Layer-3 network.

4. The device according to claim 1, wherein the data network is a Layer-3 data network, and wherein the tenant networks are Layer-3 virtualized networks that are overlaid on the Layer-3 data network.

5. The device according to claim 4, wherein the encapsulation header comprises a Generic Routing Encapsulation (GRE) header.

6. The device according to claim 1, wherein the processing circuitry is configured to decapsulate encapsulated data packets received from the data network and to convey the decapsulated data packets to the virtual machine.

7. The device according to claim 6, wherein the processing circuitry is configured to filter and convey at least a part of the received data packets to a learner entity running on the host processor.

8. A computer system, comprising:
    a memory;
    a host processor configured to access the memory, to run one or more virtual machines and to place in the memory work items with transmission instructions; and
    a network interface controller (NIC), which is configured to transmit and receive data packets over a data network, which supports multiple tenant networks overlaid on the data network, and which is configured to read from the memory a work item submitted by a virtual machine running on the host processor, and to identify, responsively to the work item a tenant network over which the virtual machine is authorized to communicate, wherein the work item specifies a message to be sent to a tenant destination address on the tenant network,
    wherein the NIC is configured to generate, in response to the work item read from the memory, a data packet containing an encapsulation header that is associated with the tenant network, and to transmit the data packet over the data network to at least one data network address corresponding to the specified tenant destination address,
    wherein the NIC is configured to receive an inner header and payload of the data packet from the virtual machine, and to construct the encapsulation header autonomously.

9. The system according to claim 8, wherein the NIC is configured to generate and transmit the data packet to the specified tenant destination address without direct involvement of a virtual machine monitor running on the host processor.

10. The system according to claim 8, wherein the data network is a Layer-3 network, and wherein the tenant networks are Layer-2 virtualized networks that are overlaid on the Layer-3 network.

11. The system according to claim 8, wherein the data network is a Layer-3 data network, and wherein the tenant networks are Layer-3 virtualized networks that are overlaid on the Layer-3 data network.

12. The system according to claim 11, wherein the encapsulation header comprises a Generic Routing Encapsulation (GRE) header.

13. The system according to claim 8, wherein the NIC is configured to decapsulate encapsulated data packets received from the data network and to convey the decapsulated data packets to the virtual machine.

14. The system according to claim 13, wherein the NIC is configured to filter and convey at least a part of the received data packets to a learner entity running on the host processor.

15. A method for communication, comprising:
    configuring a network interface controller (NIC), which is coupled by a bus to a host processor having a memory, to transmit and receive data packets over a data network, which supports multiple tenant networks overlaid on the data network;
    receiving in the NIC a work item submitted by a virtual machine running on the host processor, and identifying, responsively to the work item, a tenant network over which the virtual machine is authorized to communicate, wherein the work item specifies a message to be sent to a tenant destination address on the tenant network;

generating in the NIC, in response to the work item, a data packet containing an encapsulation header that is associated with the tenant network; and transmitting the data packet over the data network to at least one data network address corresponding to the specified tenant destination address, wherein generating the data packet comprises receiving in the NIC an inner header and payload of the data packet from the virtual machine, and constructing the encapsulation header autonomously by the NIC.

16. The method according to claim 15, wherein the data packet is generated and transmitted by the NIC to the specified tenant destination address without direct involvement of a virtual machine monitor running on the host processor.

17. The method according to claim 15, wherein the data network is a Layer-3 network, and wherein the tenant networks are Layer-2 virtualized networks that are overlaid on the Layer-3 network.

18. The method according to claim 15, wherein the data network is a Layer-3 data network, and wherein the tenant networks are Layer-3 virtualized networks that are overlaid on the Layer-3 data network.

19. The system according to claim 18, wherein the encapsulation header comprises a Generic Routing Encapsulation (GRE) header.

20. The method according to claim 15, and comprising decapsulating, in the NIC, encapsulated data packets received from the data network and conveying the decapsulated data packets to the virtual machine.

21. The method according to claim 20, and comprising filtering and conveying at least a part of the received data packets from the NIC to a learner entity running on the host processor.

22. A computer software product, for use on a computer that includes a memory and a network interface controller (NIC), which is coupled to transmit and receive data packets over a data network, which supports multiple tenant networks overlaid on the data network, wherein the product comprises a non-transient computer-readable medium in which program instructions are stored, which instructions, when read by the computer, cause a virtual machine on the computer to submit an inner header and payload and to submit to the NIC a work item including an index to encapsulation header information, causing the NIC to identify, responsively to the work item, a tenant network over which the virtual machine is authorized to communicate, wherein the work item specifies a message to be sent to a tenant destination address on the tenant network and causes the NIC to generate a data packet containing an autonomously constructed encapsulation header that is associated with the tenant network, responsive to the index to the encapsulation header information and to transmit the data packet over the data network to at least one data network address corresponding to the specified tenant destination address.

\* \* \* \* \*